Nov. 26, 1968  K. L. I. SJÖLANDER  3,413,460
OPTICAL ANTI-DAZZLING DEVICE
Filed Nov. 22, 1965  2 Sheets-Sheet 1
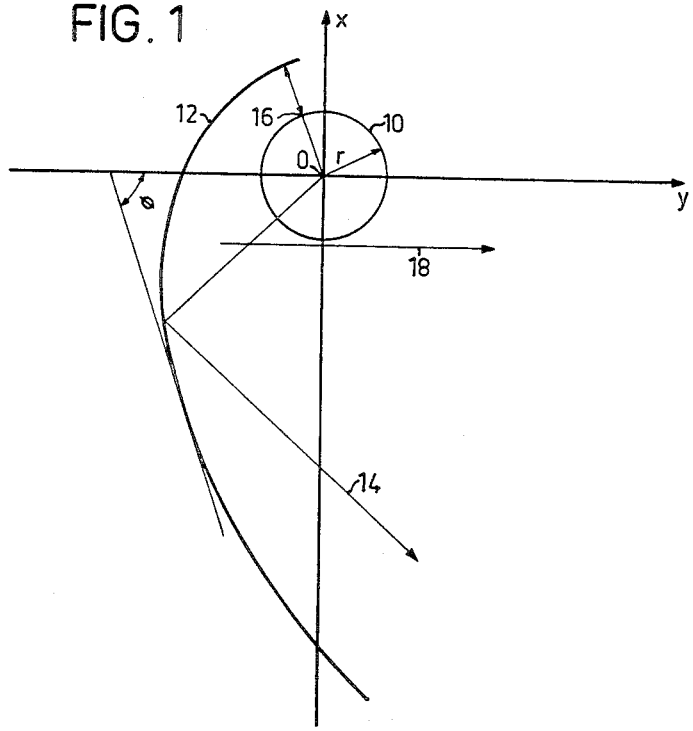
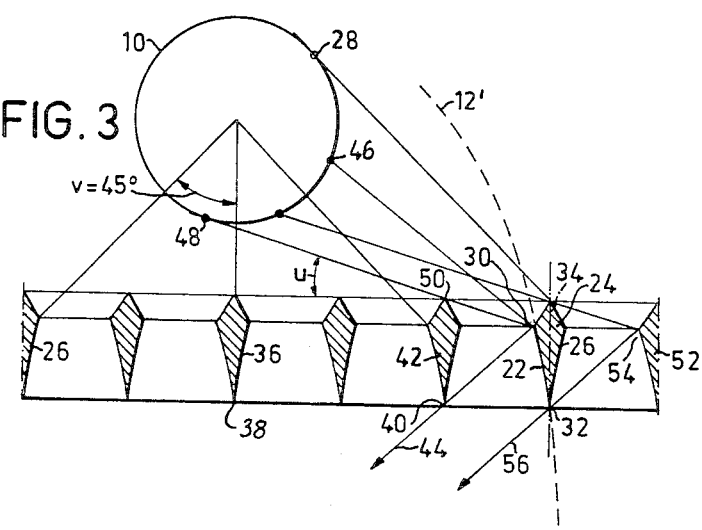
INVENTOR.
KARL LENNART INGEMAR SJÖLANDER
BY
Young & Thompson
ATTYS.

3,413,460
OPTICAL ANTI-DAZZLING DEVICE
Karl Lennart Ingemar Sjölander, Dahlerusvagen 5,
Kallhall, Sweden
Filed Nov. 22, 1965, Ser. No. 508,961
Claims priority, application Sweden, Dec. 28, 1964,
15,723/64
2 Claims. (Cl. 240—78)

ABSTRACT OF THE DISCLOSURE

An anti-dazzling device has a reflecting surface below a light source of substantial diameter. The generatrix of the reflecting surface is in the form of a curve or chord of a curve of such a character that the light falling from the source of light on the surface and reflected thereby passes below a plane that makes an angle of about 45° with a vertical through the center of the light source. The shape of the curve is defined by the equations $$x = \frac{dy}{dx}(c - 2r\phi_r) - r$$

Figure 2:
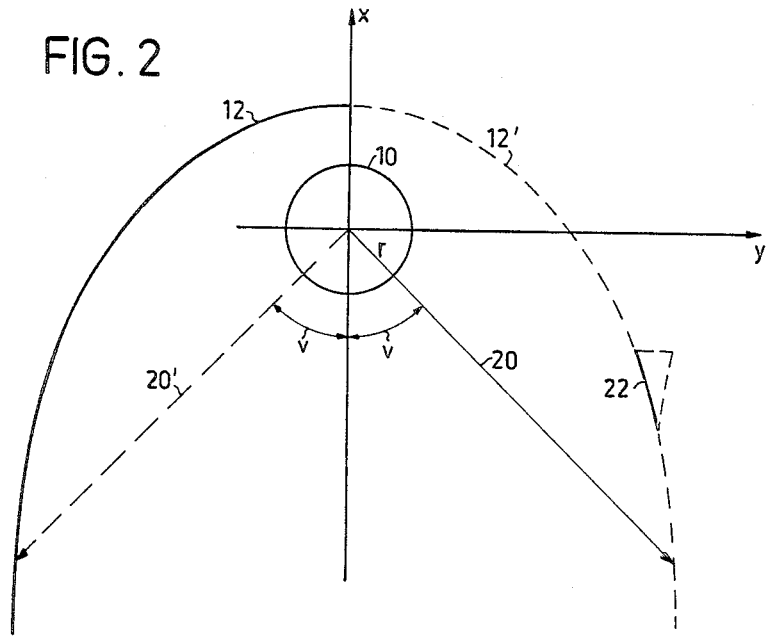

$$y = \frac{1}{2}\left[x\left(\frac{dy}{dx} - \frac{dx}{dy}\right) - r\left(\frac{dy}{dx} + \frac{dx}{dy}\right)\right]$$

The device is in the form of parallel strips, two opposite sides of each strip being shaped in accordance with the above curve, and the top edge of the strip having an upper cylindrical surface concentric with the light source.

---

In the techniques of illumination use is often made of anti-dazzling devices intended to diffuse the light from a source of light so as to reduce the dazzling effect of the source of light. The prior-art anti-dazzling devices used for instance in combination with ceiling lights in work rooms are usually constructed so that they reduce the luminance relatively uniformly within a zone of 180° measured from a horizontal plane through the centre or axis of the source of light. These devices suffer from the drawback that the luminance from the source of light is not sufficiently dimmed within the range in which direct dazzling can occur, i.e., within the angular range between 45° and 90° measured from the vertical line through the centre of the source of light. If this range is not dimmed a physiologically incorrect visibility will result in most illuminating systems because of dazzling. Also from the point of view of psychological visibility the result of the illumination is not correct because the surfaces in the room which have the highest luminance will attract most attention. In other words, the surfaces of the lighting fixture will strike the eye more than the objects that should be illuminated in the first place.

Because of the internationally recommended increased intensity of illumination the dazzling problem has become more and more difficult to master. The object of this invention is to solve the problem in a simple and rational way and at the same time to provide for the best illumination possible for various purposes, especially in work rooms.

Anti-dazzling devices are usually formed with surfaces toward which the light from the source of light is transmitted and from which the light is reflected. It is desired that the direction and dispersion of the reflected light should be such that a suitable illumination of the surfaces is obtained which are required to be illuminated whereas the surroundings should not be subjected to disturbing light. In order to obtain an optimum result result of the anti-dazzling device, as much light as possible should be emitted within a zone defined by angles of 45° in both directions measured from a vertical line through the centre of the source of light or from a vertical plane through the axis of the source of light. In addition, the reflection from the anti-dazzling device should be specular which means that the reflectance should be as close as possible to 1:1. In case of specular reflection and optimum reflectance of the anti-dazzling device and provided that the reflecting surfaces are suitably formed the resulting luminance will fairly well correspond to the mean luminance of the room within the zone from 45° to 90°, this being physiologically as well as psychologically desirable.

Previously certain attempts have been made to construct an anti-dazzling device which on the side, usually the upper side, facing the source of light is plane and has no specular reflection, but has an obliquely downwardly facing parabolic surface. However, the result has been an anti-dazzling device of very low efficiency.

This invention relates to an anti-dazzling device having reflecting surfaces of a certain form suitably directed below a source of light which generally may be spot-like or spherical or rectilinear or tubular. In its broadest aspect the invention is characterized in that the generatrix of the reflecting surface is in the form of a curve or chord of a curve of such a character that the light falling from the source of light on the surface and reflected thereby passes below a sharply defined plane which makes a certain angle, preferably 45°, with a vertical line or a vertical plane through the centre or axis, respectively, of the source of light.

However, the object of the invention is not only to provide for a suitable form and a suitable position of the reflecting surfaces of the anti-dazzling device relative to the source of light, but also to contruct the anti-dazzling device so that it screens from direct light within the ranges outside the angle indicated which is usually 45° measured from said vertical line or vertical plane.

Figure 4:
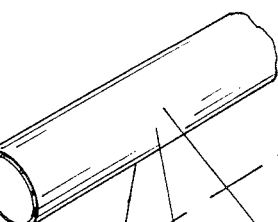

Further features of the invention and advantages obtained thereby appear from the following description of an embodiment illustrated in the annexed drawings FIGS. 1 and 2 illustrate a rectangular coordinate system with the curve on which the invention is based with regard to the form of the reflecting surface. FIG. 3 is a vertical sectional view of an anti-dazzling device consisting of parallel strips, the section being taken along a plane at right angles to the strips. FIG. 4 is a perspective view of a similar anti-dazzling device for a tubular source of light.

It can be mathematically shown how a reflecting surface near a source of light shall be formed in order to have the light reflected from the surface fall only on one side of a plane through the centre of the source of light.

In FIG. 1 there is shown a circular source of light 10 having a radius $r$ and the centre of which is located on the origin O of a rectangular coordinate system having an axis of abscissa $y$ and an axis of ordinate $x$. The curve 12 can be mathematically expressed by the equation system $$x = \frac{dy}{dx}(c - 2r\phi_r) - r$$

$$y = \frac{1}{2}\left[X\left(\frac{dy}{dx} - \frac{dx}{dy}\right) - r\left(\frac{dy}{dx} + \frac{dx}{dy}\right)\right]$$

where $c$ is an arbitrary constant,
$r$ is the radius of the fluorescent tube, and
$\phi_r$ is an expression defining the slope of the curve (angle measured in radians) to the $y$-axis such that $$\frac{dy}{dx} = \tan \phi_r$$

In practical cases, if the source of light is a fluorescent tube in the form of a cylinder emitting diffuse light $c$ may be equal to 6 and $r$ equal to 19 mm., resulting in a specially advantageous form of the curve. The curve 12 has the property of reflecting all incident light from the source of light 10 in downward directions toward the $y$-axis or further downwards. By way of example two reflected rays 14 and 16 are illustrated. The maximum strength of the reflected light occurs along a plane parallel to the $y$-axis as indicated by the arrow 18. In order to obtain the most favourable result regarding effectiveness and freedom from dazzling under the above named conditions, the limiting plane for the reflected light which in FIG. 1 is marked by the $y$-axis should make a certain angle relative to the vertical line represented by the $x$-axis. In order to have the reflecting curve located in a desired position in the coordinate system, it has to be turned about the centre O of the source of light such that the limiting plane 20 makes an angle $v$ with the $x$-axis, as is shown in FIG. 2. With the curve 12 in this position no light emitted from the source of light 10 and reflected by the curve can be directed above the line 20. The same holds true of a line 20' that makes a negative angle $v$ with the $x$-axis with regard to rays of light reflected from a curve 12' which is symmetric to the curve 12.

In an anti-dazzling device according to the invention part of the curve 12 or 12' is a generatrix of the lower reflecting surfaces of the anti-dazzling device. Such a part is marked at 22 in FIG. 2 and forms a side surface of a strip 24 in an anti-dazzling device consisting of parallel strips as illustrated in FIG. 3 which also shows a curve 12'. The curve between the points 30 and 32 may be replaced by a chord of the curve. If the source of light is tubular and rectilinear the surface is generated by moving the curve parallel to the axis of the source of light. In case of a spherical source of light the surface is generated by rotation of the curve about the vertical line through the centre of the source of light. The side surface 26 on the opposite side of the strip 24 of the anti-dazzling device is of the same form as the surface 22 but is facing in the opposite direction. The strip 24 is symmetric with respect to a vertical plane and consequently has an equally reflecting effect on rays falling on one side and on the other side of the strip.

In an effective anti-dazzling device a single strip is of course not sufficient, and a plurality of strips has to be arranged such that the desired light reflection is obtained for each point on the source of light, and consideration has to be paid to the fact that in case of fluorescent tubes each point on the shell of the tube emits light. If, as is often the case, a set of parallel fluorescent tubes is disposed above a common anti-dazzling device it has also to be seen to that the device prevents dazzling by all of the tubes.

The point 28 located on the upper part of the circumference of the fluorescent tube 10 is the tangent point of a 45° line. This point emits a ray of light which is directed above the curve section 22, the highest point 30 and the lowest point 32 of which are assumed to be determined in a manner to be described hereinbelow. Consequently, the ray of light from the point 28 has to be screened, and to this end the upper portion of the strip may be provided with an upwardly extending projection 34. Preferably, the obliquely upwardly directed side surfaces of this projection have a circular generatrix with the centre of curvature located in the source of light so that the rays of light falling on said side surfaces will be reflected toward the source of light.

In order to obtain a high efficiency within a lighting fixture comprising a plurality of parallel fluorescent tubes, the spacing of the tubes must be sufficient to provide room for a tube between two adjacent tubes. If the strip 24 is located right below the axis of the adjacent fluorescent tube similar to the location of a strip 36 right below the axis O of the tube 10, the lowermost point 32 of the curve which is assumed to be in the same horizontal plane as the lowermost point 38 of the strip 36 should be located at a distance from the point 38 equal to three tube radii, or in the practical example with a rounded off 20 mm. external radius of the fluorescent tube at a distance of 60 mm. therefrom.

The foregoing part of the description mainly concerns the reflecting surfaces of the anti-dazzling device and their properties of not directing the reflected light above the 45° line. However, the antidazzling device also should prevent, in a manner known per se, dazzling by direct light which falls above said 45° line. This is effected by suitable spacing of the strips. In this connection it is required that the height of the strip should be equal to or exceed the distance between two adjacent strips. Further, it is desirable to avoid cross reflection in the anti-dazzling device with resultant loss of light. For this reason rays of light reflected from the point 30 should pass below the lower edge 40 of the adjacent strip 42. Such a ray 44 is shown in FIG. 3. This ray is assumed to derive from light emitted from a point 46 of the fluorescent tube. In practical cases the distance between the strips is about 20 mm. In view of the requirement of 45° screening of the direct light this distance is equal to the height of the antidazzling device. After the height has been defined the position of the highest point 30 on the curve 12' can be determined by drawing a line from a point 48 on the lower part of the fluorescent tube through the highest point 50 of the adjacent strip 42 and finding out where this line intersects the curve. The point of intersection with the curve is just the point 30. Rays of light falling on the anti-dazzling device at angles to the upper side of this device less than the angle $u$ which a ray of light between the points 48 and 50 makes with said upper side can not strike any of the reflecting surfaces 22. As regards strips located farther from the source of light than the strip 24, such as strip 52, the lower parts are screened from the fluorescent tube so that rays such as a ray 56 reflected from the point 54 of the strip 52 make an angle less than 45° with the vertical line. Also for rays emitted within an angular range which is defined by lines from the axis O to the highest point of the strip 36 and the highest point 50 of the strip 42 the direct light emission through the anti-dazzling device is located within an angular range less than 45° to the vertical line.

In case of a source of light that emits light in all directions it is advantageous to arrange the strips of the anti-dazzling device in the form of a cellular pattern, as shown in FIG. 4. In this case all the strips are devised in accordance with the above indicated principles.

What I claim is:

1. An anti-dazzling device having a reflecting surface below a source of light that has a substantial radius, characterized in that the generatrix of the reflecting surface is in the form of a curve of such a character that the light falling from the source of light on the surface and reflected thereby passes below a plane which makes an angle of about 45° with a vertical line or a vertical plane through the center or axis, respectively, of the source of light, the form of the curve being defined by the equation system $$x = \frac{dy}{dx}(c - 2r\phi_r) - r$$

$$y = \frac{1}{2}\left[x\left(\frac{dy}{dx} - \frac{dx}{dy}\right) - r\left(\frac{dy}{dx} + \frac{dx}{dy}\right)\right]$$

wherein the origin of the coordinate system lies on the center or axis of the light source and where $c$ is an arbitrary constant
$r$ is the radius of the light source, and
$\phi_r$ is an expression defining the slope of the curve to the y-axis such that $$\frac{dy}{dx} = \tan \phi_r$$

2. An tnti-dazzling device having a reflecting surface below a source of light, the generatrix of the reflecting surface being in the form of a curve or chord of a curve of such a character that the light falling from the source of light on the surface and reflected thereby passes below a plane which makes an angle of about 45° with a vertical plane through the axis of the light source, said device being in the form of parallel strips, two opposite sides of each strip being shaped in accordance with the chord or curve so that a cross-sectional view of such a strip is limited on either side by a line that forms said curve or chord, characterized in that a dimming portion extending along the top edge of the strip is adapted to reflect light falling thereon back to the source of light, the reflecting surface of the dimming top portion being cylindrical with the axis of the cylinder coinciding with the axis of the light source, said top portion having a screening effect on the lower portions of the strips.

References Cited
UNITED STATES PATENTS
2,971,083   2/1961   Phillips et al. _____ 240—46.39

FOREIGN PATENTS
21,901   1910   Great Britain.

NORTON ANSHER, *Primary Examiner.*
MONROE H. HAYES, *Assistant Examiner.*